(12) United States Patent
Cangiani

(10) Patent No.: US 8,295,547 B1
(45) Date of Patent: Oct. 23, 2012

(54) MODEL-BASED FEATURE TRACKING IN 3-D AND 2-D IMAGERY

(75) Inventor: Gene L. Cangiani, Parsippany, NJ (US)

(73) Assignee: Exelis, Inc, McLean, VA (US)

( * ) Notice: Subject to any disclaimer, the term of this patent is extended or adjusted under 35 U.S.C. 154(b) by 346 days.

(21) Appl. No.: 12/787,667

(22) Filed: May 26, 2010

(51) Int. Cl.
*G06K 9/00* (2006.01)
*G01S 19/38* (2010.01)

(52) U.S. Cl. ............... 382/103; 382/291; 342/357.21

(58) Field of Classification Search .......... 382/100, 382/107, 154, 168, 173, 181, 190–195, 199–206, 382/220, 232, 254, 274, 276, 291, 305, 312; 342/77, 173, 458, 357.21; 89/1.11; 706/16
See application file for complete search history.

(56) References Cited

U.S. PATENT DOCUMENTS

| | | | | |
|---|---|---|---|---|
| 4,855,932 | A * | 8/1989 | Cangiani et al. | 342/77 |
| 5,020,411 | A * | 6/1991 | Rowan | 89/1.11 |
| 5,911,035 | A * | 6/1999 | Tsao | 706/16 |
| 5,960,097 | A * | 9/1999 | Pfeiffer et al. | 382/103 |
| 7,965,867 | B2 * | 6/2011 | Lanz | 382/103 |
| 8,026,844 | B2 * | 9/2011 | Fox et al. | 342/173 |
| 8,063,825 | B1 * | 11/2011 | Yang | 342/458 |

OTHER PUBLICATIONS

Maybeck, Peter S., and Rogers, Steven K., "Adaptive tracking of multiple hot-spot target IR images", IEEE Transactions on Automatic Control, vol. AC-28, No. 10, pp. 937-943, Oct. 1983.
Maybeck, Peter S., and Mercier, Daniel E. "A target tracker using spatially distributed infrared measurements," IEEE Transactions on Automatic Control, vol. AC-25, No. 2, pp. 222-225, Apr. 1980.
Maybeck, Peter S., Jensen, Robert L., and Harnly, Douglas A., "An adaptive extended Kalman filter for target image tracking", IEEE Transactions on Automatic Control, vol. AES-17, No. 2, pp. 173-180, Mar. 1981.

* cited by examiner

*Primary Examiner* — Seyed Azarian
(74) *Attorney, Agent, or Firm* — RatnerPrestia

(57) ABSTRACT

A feature tracker for tracking a target includes an imaging sensor for imaging the target and a Kalman filter for generating predicted position, velocity and acceleration of the imaging sensor with respect to the target. The Kalman filter includes a state vector estimate of the position, velocity and acceleration of the imaging sensor, and a model for characterizing the target. The model characterizes the target by using at least one bivariate Gaussian function for the target. The Kalman filter includes a Jacobian matrix defined as a partial derivative of the model with respect to the state vector estimate. The Kalman filter includes a gain matrix generated from the Jacobian matrix.

17 Claims, 4 Drawing Sheets

MODEL-BASED FEATURE TRACKING IN 3-D AND 2-D IMAGERY

FIELD OF THE INVENTION

The present invention relates, in general, to electro-optical (E/O) feature tracking. More specifically, the present invention relates to using a Kalman filter to track features of a target represented by a primitive model.

BACKGROUND OF THE INVENTION

There are many applications for frame-to-frame tracking and/or registration of features in imagery from three-dimensional (3-D) sensors, such as LADARs (Laser Detection and Ranging), as well as from conventional two-dimensional (2-D) sensors, such as cameras, FLIRs (Forward Looking Infrared), and night vision devices. A typical LADAR emits a laser flash and then provides two types of images: a 2-D gray scale image, where each pixel represents the intensity of the laser reflection at that location; and a 3-D point cloud where each pixel represents a measure of the distance from the image plane to the object in that pixel. The term LIDAR (Light Detection and Ranging) is sometimes used for the 3-D imaging sensor. Some of the applications for frame-to-frame tracking include navigation, surveillance, geo-location, image registration and targeting.

Typical feature tracking algorithms select distinctive features in the subject images, such as edges and corners, which may be detected in subsequent frames for registration and tracking. In order to enable tracking during motion of the sensor or target, various image transformations are used to make the selected features invariant to scale. Another required transformation is feature rotation, such that the feature may be tracked from various aspect angles, as the sensor and/or target progress along a trajectory.

Once the tracked feature is successfully located in the current image frame, and matched to the same feature from previous image frames, its location in the image may be used to register the image. In a tracking or navigation scenario, the location of the tracked feature may be used as a measurement, along with measurements from other sensors performing the navigation or tracking function.

In conventional systems, the process of feature extraction and matching is a separate, computationally intensive process, which is performed externally to any extended Kalman filter (EKF) used by a navigation or tracking system. Conventional feature extraction actually strips away information that may be useful in estimating the sensor and/or target dynamics, such as image scale and aspect variation. This is especially true for 3-D imagery available from LADAR (or LIDAR) sensors. Another shortcoming of conventional systems is that the feature tracking process is vulnerable to occlusion of the features in a dynamic scenario.

As will be explained, the present invention utilizes low fidelity primitive models of some of the gross, prominent features in an image environment, as opposed to detailed, high contrast features, such as edges or corners. Tracking of these models is performed directly in the extended Kalman Filter (EKF), as opposed to needing to pre-process the image data. Any changes in scale and aspect angle with the sensor and/or target dynamics are incorporated in the model. Instead of removing the scale and aspect variation prior to inputting the image data to the EKF, the present invention utilizes the scale and aspect changes within the EKF itself, thereby enhancing the estimation of sensor and/or target location and dynamics.

As will be explained, the composite model used in the EKF is a superposition of individual primitive models that represent some dominant 3-D structures in the environment. The primitives may be easily removed or added, based on predicted start or end of occlusions. The primitive models are also mathematically well behaved functions that exist everywhere and whose derivatives exist everywhere, making them very amendable to incorporation into an EKF. These advantages, as well as other advantages of the present invention are described below.

SUMMARY OF THE INVENTION

To meet this and other needs, and in view of its purposes, the present invention provides a feature tracker for tracking features in a scene. The tracker includes an imaging sensor for imaging the target; and a Kalman filter for generating predicted position, velocity and acceleration of the imaging sensor with respect to the target. The Kalman filter includes a state vector estimate including position, velocity and acceleration of the imaging sensor, and a model for characterizing the target. The model includes at least one bivariate Gaussian function to model the target feature.

The Kalman filter includes a Jacobian matrix defined as a partial derivative of the model with respect to the state vector estimate.

The measurement model includes a projection of the bivariate Gaussian function onto an image plane, and the bivariate Gaussian function includes the form of:

$$p(x, y) = A * e^{\left(-\frac{(x-m_x)^2}{2\sigma_x^2} - \frac{(y-m_y)^2}{2\sigma_y^2}\right)}$$

where A is the magnitude of the function,
$m_x$ and $m_y$ are centers of the function in an x, y plane, and
$\sigma_x$ and $\sigma_y$ define the width of the model in the x and y directions.

In addition, $\Theta$ may be included, where $\Theta$ represents a rotation in the x, y plane.

The Kalman filter includes a gain matrix generated from the Jacobian matrix, and the gain matrix is multiplied by a difference between an actual measurement vector and an expected measurement vector to provide the state vector estimate.

The imaging sensor may include a LADAR, FLIR or camera, and the model may include a terrain map with a primitive function defining the target. In addition, the model may include at least two bivariate Gaussian functions, each bivariate Gaussian function defining a separate target in a terrain map. The model may include a Gaussian ellipse defining a three-dimensional structure projected onto a two-dimensional plane of an image taken by the imaging sensor.

Another embodiment of the present invention is to generate a model of a terrain for use by a navigation/tracking system. The model includes at least one primitive representing one feature in the actual terrain. The primitive is a bivariate Gaussian function having the following form:

$$p(x, y) = A * e^{\left(-\frac{(x-m_x)^2}{2\sigma_x^2} - \frac{(y-m_y)^2}{2\sigma_y^2}\right)}$$

where A is the magnitude of the function,
$m_x$ and $m_y$ are centers of the function in an x, y plane, and $\sigma_x$ and $\sigma_y$ define the width of the model in the x and y directions.

In addition, $\Theta$ may be included, where $\Theta$ represents a rotation in the x, y plane. In this embodiment the state vector in the EKF is composed of the model parameters, as opposed to the sensor dynamics.

Still another embodiment of the present invention is a method of tracking a target. The method includes the following steps:

imaging the target by an imaging system;

predicting position, velocity and acceleration of the target with respect to the fixed terrain, using a Kalman filter;

modeling the target in the Kalman filter using a bivariate Gaussian function; and generating a gain matrix in the Kalman filter by determining sensitivity of the bivariate Gaussian function to predicted position, velocity and acceleration of the imaging system.

The bivariate Gaussian function has the following form:

$$p(x, y) = A * e^{\left(-\frac{(x-m_x)^2}{2\sigma_x^2} - \frac{(y-m_y)^2}{2\sigma_y^2}\right)}$$

wherein A is the magnitude of the function, $m_x$ and $m_y$ are centers of the function in an x, y plane, and $\sigma_x$ and $\sigma_y$ define the width of the model in the x and y directions.

In addition, $\Theta$ may be included, where $\Theta$ represents a rotation in the x, y plane.

The method includes the step of generating a state vector including position, velocity and acceleration in the Kalman filter. Modeling the target includes the step of generating a measurement matrix in the Kalman filter. Determining the sensitivity of the bivariate Gaussian function includes the step of calculating a partial derivative of the measurement matrix with respect to an estimate of the state vector. Imaging the target includes the step of using one of either a LADAR, a FLIR, or a camera, and modeling the target includes the step of replacing the target with the bivariate Gaussian function.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

A system and method of the present invention will now be described for a navigation application, but, as described above, there are many applications for the present invention with various embodiments. One particular application is for an airborne platform which includes a GPS receiver, an inertial measurement unit (IMU), an imaging sensor (such as a LADAR, a FLIR, or a camera) and an altitude sensor (such as a barometer or radar altimeter) to provide continued navigation when GPS is denied.

Figure 1:
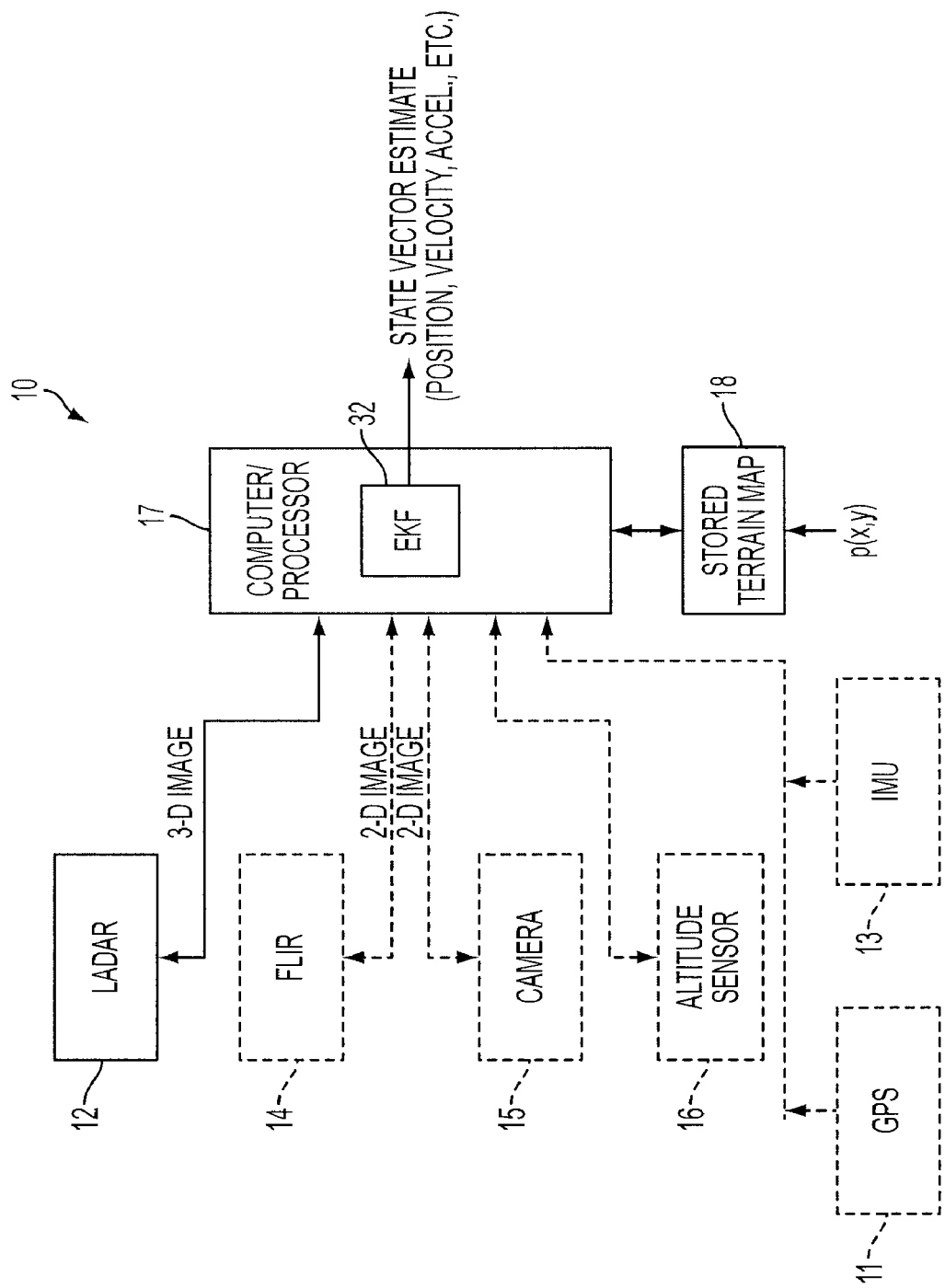
FIG. 1 is a block diagram of a navigation/tacking system using a stored terrain map that includes models representing one or more features in a region of interest, for tracking the feature, in accordance with an embodiment of the present invention.

A navigation and/or tracking system in accordance with a typical embodiment of the present invention is shown in FIG. 1. As shown, system 10 includes GPS receiver 11, inertial measurement unit (IMU) 13, LADAR sensor 12, computer/processor 17 and a stored terrain map 18. Computer/processor 17 includes an extended Kalman filter (EKF). In another embodiment, system 10 may include FLIR sensor 14, or camera 15, in lieu of LADAR sensor 12. Whereas LADAR sensor 12 provides 3-D images for processing by computer/processor 17, it will be appreciated that a FLIR sensor, or a camera provides 2-D images for processing by the computer/processor. An optional altitude sensor, such as a barometric altimeter or a radar altimeter, designated as 16, may also be used to provide altitude data to the computer/processor, in order to aid the EKF in altitude measurements of the platform hosting the image sensor. When GPS is denied, the IMU, by itself, may maintain navigation accuracy for short periods of time, but when coupled with the present invention navigation accuracy may be maintained indefinitely.

The stored terrain map may be generated manually, by placing model primitives at a selected subset of dominant features, such as buildings or hills, based on information from conventional terrain maps. Alternatively, the terrain map may be generated automatically by using the present invention in a feature mapping mode (described later), while navigating via other means, for example, by a GPS or an IMU. Another alternative is to utilize the present invention in a hybrid role to perform simultaneous location and mapping (SLAM) functions.

It will be appreciated that many practical navigation applications include image feature tracking as an adjunct to a primary navigation system, such as GPS or inertial navigation system (INS). As will be described, however, the present invention, when incorporating a LADAR as the electro-optical sensor, or when utilizing a separate ranging sensor with a 2-D electro-optical sensor, may perform the navigation function autonomously, without GPS and without any INS.

Typical primitive models that may be used by the present invention are bivariate Gaussian functions. Any prominent structure, which may already be stored in a terrain map, may be replaced or newly modeled by either a single Gaussian primitive, or as a superposition of multiple Gaussian primitives. The Gaussian primitives have the following form:

$$p(x, y) = A * e^{\left(-\frac{(x-m_x)^2}{2\sigma_x^2} - \frac{(y-m_y)^2}{2\sigma_y^2}\right)}$$

where A is the magnitude of the function, $m_x$ and $m_y$ define the center of the function in the xy plane, and $\sigma_x$, $\sigma_y$ define the width of the model in the x and y directions.

It will be understood that rotation of the model with respect to the coordinate axes is defined by an additional parameter, $\Theta$, which is not included in the above expression. Thus, each primitive in the model is completely defined by six (6) parameters.

Figure 2:
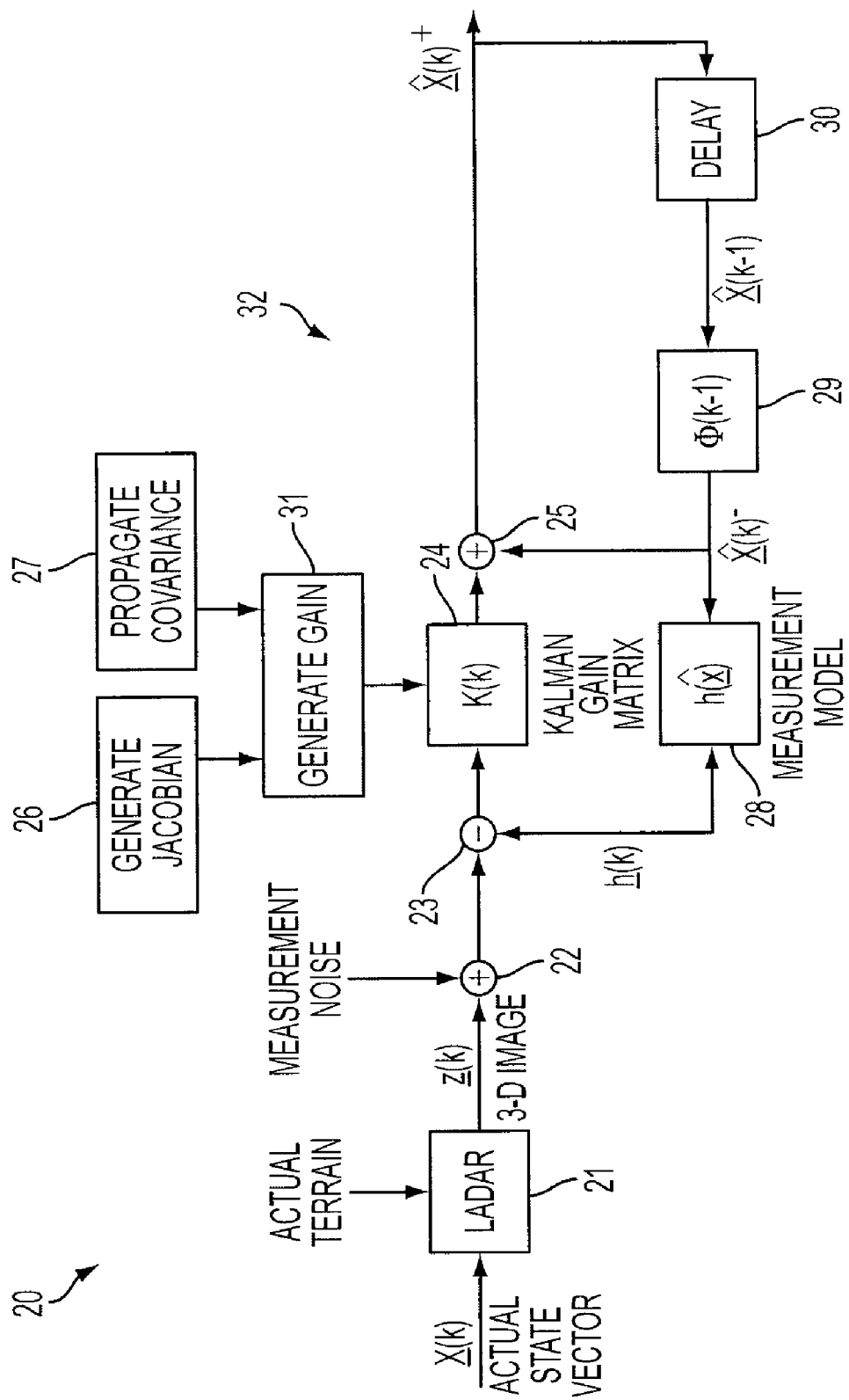
FIG. 2 is a block diagram of a LADAR sensor coupled to an extended Kalman filter, the Kalman filter including model-based feature tracking by the present invention.

Referring next to FIG. 2, there is shown an embodiment of an EKF used by the present invention together with a LADAR sensor and a measurement model including projection of the Gaussian primitives having the above expression onto an image plane. As shown, navigation/tracking system 20 includes LADAR 21 which provides 3-D image data to the input of an EKF, the latter generally designated as 32. the LADAR, for example, may have a field-of-view (FOV), as seen by an array of pixels, for imaging a scene of interest. The output from the LADAR sensor may be processed pixel data, or may be raw data. The data are provided to the computer/processor 17 shown in FIG. 1.

Alternatively, other primitives, such as Gaussian ellipsoids, may be used with the current invention to model prominent features in a scene of interest, and the projection of these prominent features onto the image plane forms the measurement model in the EKF.

In an exemplary operation, the pixel intensities may be used directly, or averaged to form a lower resolution sub-array (to reduce processing load). The individual elements of the array (or sub-array) are then ordered into a column vector. Next, the column vector is augmented with the current target range measurement. The resultant is a measurement vector designated z(k), which is present at the output of the LADAR sensor. The measurement vector is then processed by the extended Kalman filter 32.

The output of LADAR sensor 21 is combined with a measurement noise vector by a first adder, designated as 22. A subtractor, designated as 23, subtracts an estimate of the current measurement vector, h(k), from the actual measurement vector, z(k). The resultant difference, or residual, is provided to a Kalman gain matrix, K(k), designated as 24. The output of the Kalman gain matrix is added to an estimate of the current measurement $\hat{x}^-$ by a second adder, designated as 25. This addition provides the output of the EKF which is the EKF state vector, $\hat{x}(k)^+$.

The carat ( ^ ) indicates that the quantity is an estimate and the k indicates that the estimate is at iteration number k. The number k is part of time kT, where k is the number of measurements and T is the interval between measurements. The plus sign (+) indicates a time immediately after the measurement, and the minus sign (−) indicates a time just before the measurement.

The target dynamics model 29 computes the predicted state estimate based on a previous estimate. The previous estimate is obtained by delay generator 30, which is stored in a memory (not shown). The previous estimate, $\hat{x}(k-1)$, is provided as an input to the target dynamics model, also referred to as the state transition matrix, $\phi(k-1)$. The state transition matrix that is used in any embodiment of this invention is dependent on the particular dynamics model chosen for that application.

At the next iteration, delay generator 30 releases the state vector estimate, which is used for two purposes. It is provided to measurement model 28 to generate a new measurement estimate and to second adder 25 to form the basis for a "new" present state vector estimate, $\hat{x}(k)^+$ when combined with the product of the residuals and the Kalman gain matrix.

It will now be appreciated that the purpose of EKF 32 is to provide an estimate of the position, velocity and acceleration of the target with respect to the LADAR sensor. These quantities are represented by the state vector, referred to previously as x(k) and shown in expanded form as follows:

$$x=(xyz\dot{x}\dot{y}\dot{z}\ddot{x}\ddot{y}\ddot{z})$$

where the first three terms are x, y, z positions,
the second three terms are x, y, z velocities, and
the third three terms are x, y, z accelerations.

In each iteration, the state vector x is updated to an approximation of the actual position, velocity, and acceleration of the target with respect to the LADAR sensor.

The present estimate $\hat{x}(k)$ is first provided to the target dynamics model 29 to generate the next estimate. The next estimate is generated by the target dynamics model by multiplying the state vector by the state transition matrix, $\phi$.

Still referring to FIG. 2, the measurement model h($\hat{x}$), designated as 28, includes the primitive models of bivariate Gaussian functions, p(x,y). According to the present invention, the primitive models may include a single Gaussian primitive, or a superposition of multiple Gaussian primitives, each having the form of p(x,y). Other functions with similar properties, such as Gaussian ellipsoids, either implemented singly or as superposition of multiple functions, may also be included.

As described previously, in a navigation application, the EKF state vector, x, is typically composed of position, velocity and acceleration of the sensor platform, and the measurement model, h, in the EKF is formulated by scaling, translating, and coordinate rotating the set of primitives according to the current state vector estimate, $\hat{x}$. Assuming that the imaging sensor is fixed to the vehicle body frame, as opposed to a gimbaled sensor, the image plane is in a fixed orientation relative to the vehicle velocity vector.

A process, or method to generate the measurement model, h, is then: (a) perform a series of coordinate rotations to obtain the projection of primitive model functions onto the image plane, and (b) scale and translate the coordinates, based on estimated distance from the image plane to the target scene and based on estimated offset of the image plane from the center of the scene. These steps are basic mathematical functions known to those skilled in the art.

For applications utilizing a LADAR sensor, the actual measurements include a 3-D point cloud, where the value at each pixel location represents the distance between the object and the sensor. The measurement model, h, is similar 3-D point cloud that represents a projection of the 3-D model onto the 3-D image plane coordinates. In applications utilizing a 2-D sensor, such as a camera or FLIR sensor, the measurement model is generated as a projection of the 3-D model onto a 2-D image plane, resulting in a superposition of Gaussian ellipses.

In the EKF, the measurement model, hh, represents the "expected" set of measurements and is subtracted from the actual measurement vector, z, which is the 3-D point cloud from the LADAR sensor, the latter arranged into a vector of measured distances. This difference between actual and expected measurements is multiplied by the Kalman gain matrix and is used to update the current state estimate, $\hat{x}$, as previously described.

Generation of the Kalman gain matrix, K, and propagation of the covariance matrix, P, respectively shown in FIG. 2 as element 31 and element 27, are standard operations in Kalman filter implementations and are known to those skilled in the art.

A critical portion of the extended Kalman filter formulation is the Jacobian matrix, H, shown as element 26 in FIG. 2. The Jacobian matrix, H, provides the sensitivity between the measurement model and the state vector estimate. The Jacobian matrix is defined as a partial derivative of the measurement model with respect to the state vector estimate, as follows:

$$H = \frac{\partial h(\overline{x})}{\partial(\overline{x})}$$

Any rotated, scaled and translated primitive function may be readily differentiated because of the well behaved nature of Gaussian functions. The functions exist everywhere with no discontinuities or singularities. The Jacobian matrix defines the sensitivity of the state vector estimate to changes in the image.

Another significant advantage of the present invention is the Jacobian is composed of rotated, scaled and translated Gaussians that are localized to the regions of the model primitives. The values of the Gaussians fall off exponentially, when moving away from these localized regions. As a result, the navigation/tracking system is not sensitive to other objects in the sensor field-of-view and is capable of tracking the model primitives, regardless of other things happening in the scene.

It will be understood that the EKF depicted in FIG. 2 only shows the measurements and states associated with processing of LADAR imagery. In a multi-sensor system, the EKF has additional measurements from other sensors. These additional measurements may include additional states, such as gyro and accelerometer biases for an IMU, and altitude bias for an altimeter. Processing measurements and states from multiple sensors in a single Kalman filter is referred to as a tight or ultra-tight coupling. The tight coupling results in improved performance relative to that achievable with multiple independent filters. The model-based feature of the present invention is amenable to tight and ultra-tight coupling applications, because the associated processing is itself a Kalman filter.

Figure 3:
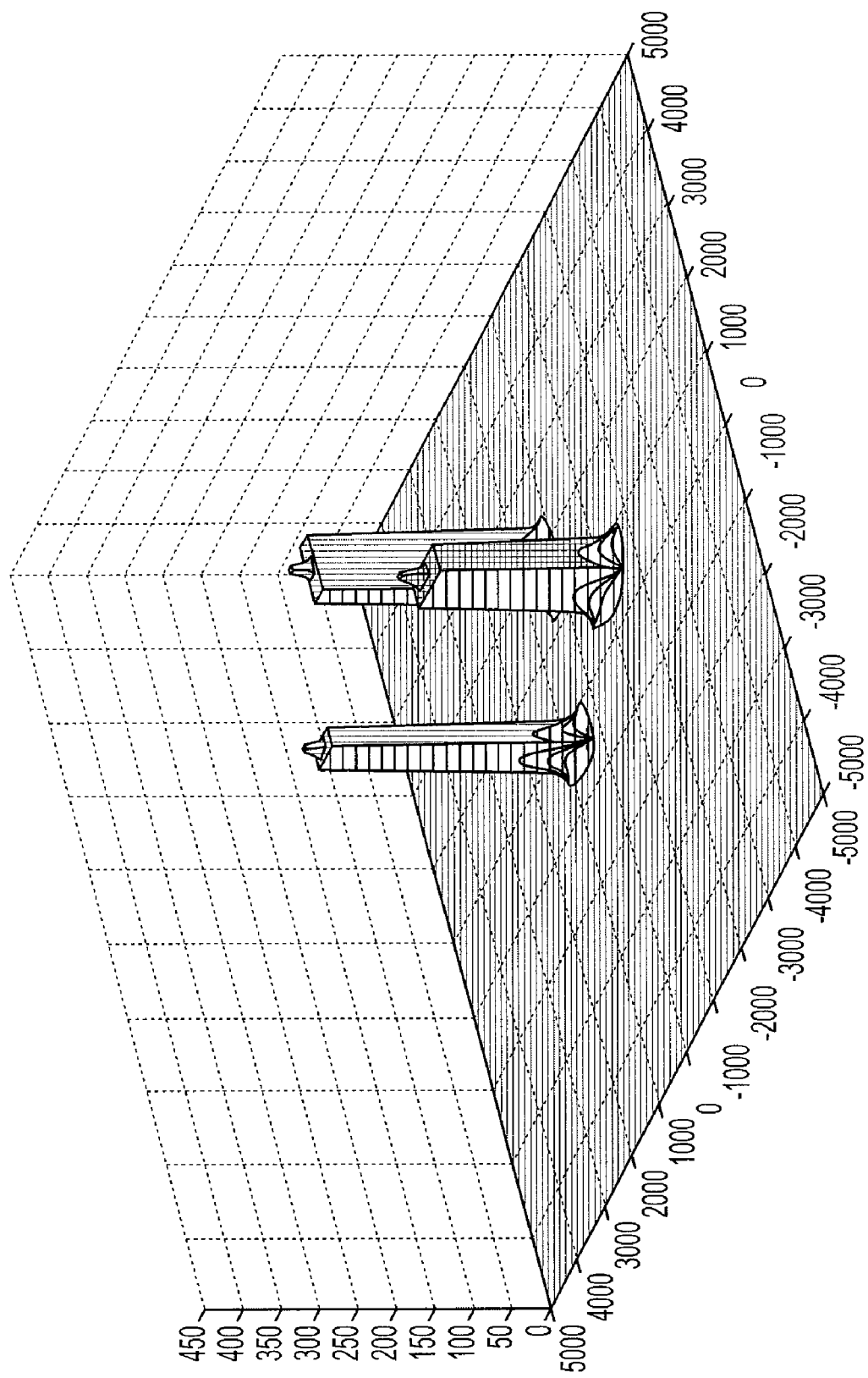
FIG. 3 is an exemplary illustration of three buildings in a terrain map with three primitive models that represent the buildings superimposed, in accordance with an embodiment of the present invention.

A simple terrain map which includes three rectangular solids representing three buildings in an urban environment is shown in FIG. 3. Three bivariate Gaussian functions, one function for each building, have been superimposed on the buildings. It will be appreciated that the model does not represent a good fit to the "actual" terrain model in the usual sense of the word. The changes in model image position, aspect, and scale, however, track corresponding changes in the "actual" terrain image and, therefore, serves to estimate the sensor dynamics very well.

It will be understood that for simple, uncluttered terrains, a single Gaussian function, modeling a single prominent feature may suffice, but for most practical terrains, multiple Gaussians are required, because of the localized nature of the Jacobian. Sensitivity of the Jacobian falls off rapidly, when moving away from the estimated locations of the model primitives. Thus, if the model included only a single primitive, the system may zero in on the single structure represented by the primitive, but may track the wrong structure in a multi-structure environment. However, when the model includes multiple primitives, the system intrinsically utilizes the spatial relationship among the primitives, as well as the behavior of the primitives themselves in the estimation and tracking process. This characteristic precludes assigning primitives in the model to the wrong structures in the terrain.

The terrain map described above with respect to the navigation/tracking system shown in FIG. 1 assumes an existing model of the terrain. The model may have been generated manually, or automatically from a terrain map. Alternatively, the present invention may be used in a terrain mapping mode, during a mapping flight over the terrain. In this case, navigation may be performed by other systems, such as a GPS or an inertial system, and the state vector may be estimated using the present invention, where the state vector includes parameters that define the Gaussian primitives for the terrain model (six parameters per primitive, as described previously).

Figure 4:
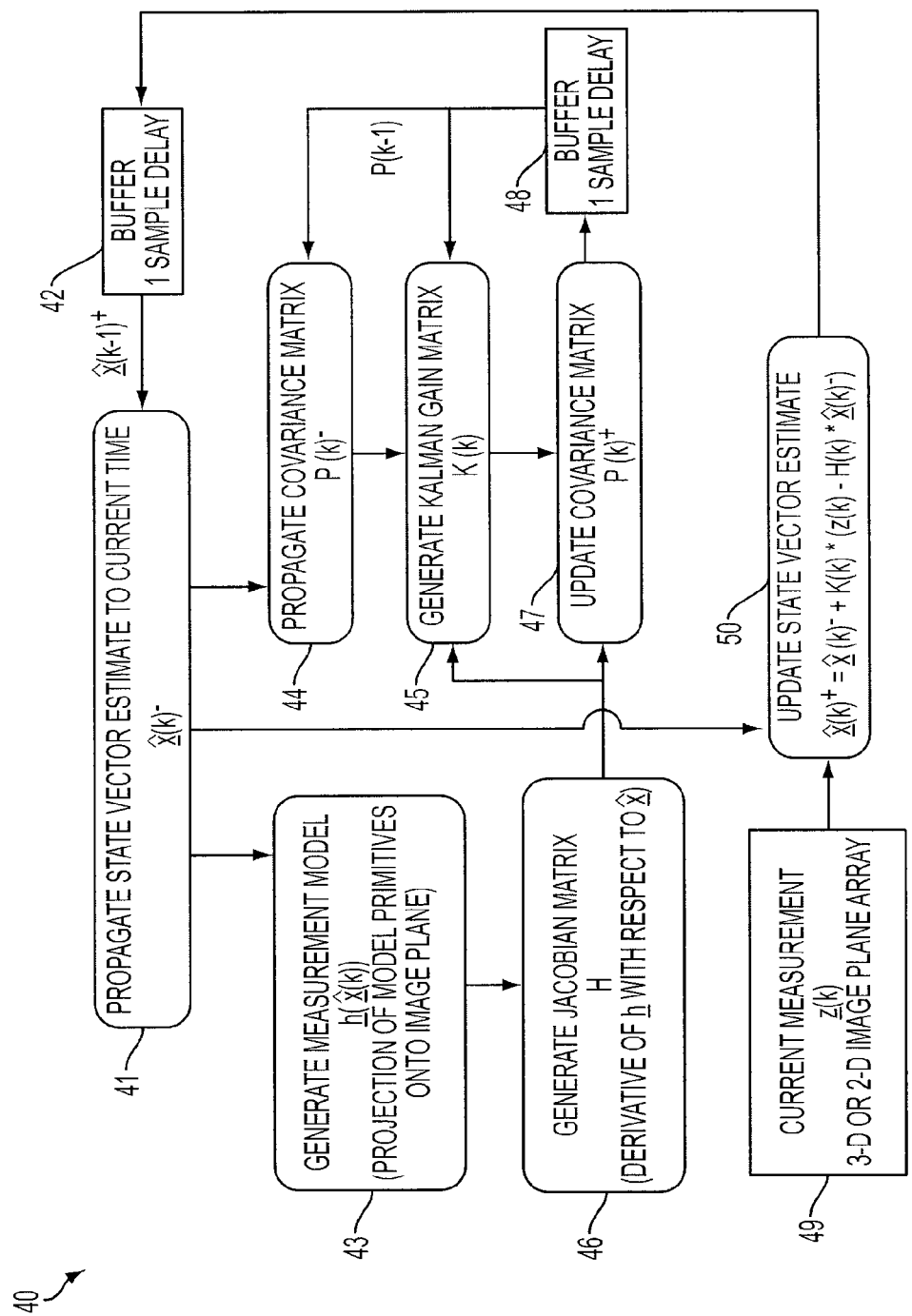
FIG. 4 is a method of feature tracking by the present invention using the system shown in FIG. 2.

Referring next to FIG. 4, there is shown a method of navigation using an extended Kalman filter, the method generally designated as 40. In step 49 of the method, the current measurement vector is obtained using a LADAR sensor, a FLIR sensor, or a camera to obtain either 3-D imagery, or 2-D imagery. If a LADAR sensor is used as shown in FIG. 2, the current measurement vector includes 3 dimensional line-of-sight range to each pixel array, or a lower resolution sub-array generated by averaging neighboring pixels in the pixel array.

Step 41 propagates the state vector estimate to the current time using a feedback loop (as shown in FIG. 2) that includes step 50 (updating the state vector estimate) and feeding the update through a one sample delay buffer 42. The state vector may include various states, such as 3-D position, 3-D velocity, 3-D acceleration, etc., depending on the type of data obtained from other sensors, such as an IMU, a GPS, an altimeter, etc.. The state vector, thus, includes the position and dynamics of the sensor platform for system navigation applications. The propagation of the state vector estimate, in step 41, is accomplished by way of the transition matrix 29, shown in FIG. 2.

It will be understood that for terrain modeling applications, the state vector includes the parameters that define the model primitives. These are the six parameters defined previously that are used by the present invention to model various features in a terrain found in a region of interest.

The output of step 41 is provided to generate the measurement model in step 43. The measurement model includes a projection of model primitives onto an image plane. The primitive models may include a single Gaussian primitive, or a superposition of multiple Gaussian primitives, each having the form of p(x,y).

The Jacobian matrix is generated next in step 46. As described before, the Jacobian matrix is a partial derivative of the measurement model with respect to the state vector estimate.

Concluding the description of FIG. 4, steps 44, 45 and 47 provide the update of the covariance matrix by passing the previous update through a one sample delay buffer 48 and generating the Kalman gain matrix.

This invention may be utilized in almost all applications using 3-D and 2-D sensors. These applications may include navigation, surveillance, geo-positioning, target tracking, image registration, motion detection, scene characterization, and terrain mapping.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A feature tracker for tracking features in a scene comprising:
    an imaging sensor for imaging the target,
    a Kalman filter for generating predicted position, velocity and acceleration of the imaging sensor with respect to the target,
    the Kalman filter including
    a state vector estimate including position, velocity and acceleration of the imaging sensor, and
    a model for characterizing the target,
    wherein the model includes at least one bivariate Gaussian function to model the target feature, and the model includes at least two bivariate Gaussian functions, each bivariate Gaussian function defining a separate target in a terrain map.

2. The tracker of claim 1 wherein
the Kalman filter includes a Jacobian matrix defined as a partial derivative of the model with respect to the state vector estimate.

3. The tracker of claim 1 wherein
the measurement model includes a projection of the bivariate Gaussian function onto an image plane, and
the bivariate Gaussian function includes the form of $$p(x, y) = A * e^{\left(-\frac{(x-m_x)^2}{2\sigma_x^2} - \frac{(y-m_y)^2}{2\sigma_y^2}\right)}$$

where A is the magnitude of the function,
$m_x$ and $m_y$ are centers of the function in an x, y plane, and
$\sigma_x$ and $\sigma_y$ define the width of the model in the x and y directions.

4. The tracker of claim 1 wherein
the Kalman filter includes a gain matrix generated from the Jacobian matrix, and
the gain matrix is multiplied by a difference between an actual measurement vector and an expected measurement vector to provide the state vector estimate.

5. The tracker of claim 1 wherein
the model includes a projection of a primitive function onto a plane of an image provided by the imaging sensor.

6. The tracker of claim 1 wherein
the model includes a primitive function defining the target.

7. The tracker of claim 1 wherein
the imaging sensor includes a LADAR, FLIR or camera, and
the model includes a terrain map with a primitive function defining the target, and
the primitive function is a bivariate Gaussian function.

8. The tracker of claim 1 wherein the model includes a Gaussian ellipse defining a three-dimensional structure projected onto a two-dimensional plane of an image taken by the imaging sensor.

9. A model of a terrain for use by a navigation/tracking system comprising:
a terrain map including at least one feature stored in a memory, and at least one primitive representing the feature stored in the memory,
wherein at least one primitive is substituted for the feature stored in the memory, and
at least two primitives represent two different features in the terrain map, and
the navigation/tracking system images the two different features and determines position, velocity and acceleration of the navigation/tracking system with respect to the two different features in the terrain map.

10. The model of a terrain in claim 9 wherein
the primitive is a bivariate Gaussian function.

11. The model of a terrain in claim 10 wherein
the bivariate Gaussian function has the form of $$p(x, y) = A * e^{\left(-\frac{(x-m_x)^2}{2\sigma_x^2} - \frac{(y-m_y)^2}{2\sigma_y^2}\right)}$$

where A is the magnitude of the function,
$m_x$ and $m_y$ are centers of the function in an x, y plane, and
$\sigma_x$ and $\sigma_y$ define the width of the model in the x and y directions.

12. The model of a terrain in claim 10 including a LADAR, FLIR, or camera for providing a flight path for the navigation/tracking system.

13. A method of tracking a target comprising the steps of:
imaging the target by an imaging system;
predicting position, velocity and acceleration of the imaging system with respect to the target, using a Kalman filter;
modeling the target in the Kalman filter using a bivariate Gaussian function; and
generating a gain matrix in the Kalman filter by determining sensitivity of the bivariate Gaussian function to predicted position, velocity and acceleration of the imaging system, and
wherein the target includes at least two features in a terrain map, and
modeling includes replacing the two features with the two bivariate Gaussian functions.

14. The method of claim 13 wherein
the bivariate Gaussian function has the following form $$p(x, y) = A * e^{\left(-\frac{(x-m_x)^2}{2\sigma_x^2} - \frac{(y-m_y)^2}{2\sigma_y^2}\right)}$$

wherein A is the magnitude of the function,
$m_x$ and $m_y$ are centers of the function in an x, y plane, and
$\sigma_x$ and $\sigma_y$ define the width of the model in the x and y directions.

15. The method of claim 14 including $\Theta$,
where $\Theta$ defines a rotation of the model in the x,y plane.

16. The method of claim 13 including the step of:
generating a state vector including position, velocity and acceleration in the Kalman filter; and
wherein modeling the target includes generating a measurement matrix in the Kalman filter, and
determining the sensitivity of the bivariate Gaussian function includes calculating a partial derivative of the measurement matrix with respect to an estimate of the state vector.

17. The method of claim 13 wherein
imaging the target includes using one of either a LADAR, a FLIR, or a camera; and
modeling the target includes replacing the target with the bivariate Gaussian function.

* * * * *